US010638749B2

(12) United States Patent
Tan

(10) Patent No.: US 10,638,749 B2
(45) Date of Patent: May 5, 2020

(54) LONG-LASTING DISINFESTATION ARTICLE AND METHOD OF MANUFACTURE THEREOF

(71) Applicant: Dong Lin Eugene Tan, Singapore (SG)

(72) Inventor: Dong Lin Eugene Tan, Singapore (SG)

( * ) Notice: Subject to any disclaimer, the term of this patent is extended or adjusted under 35 U.S.C. 154(b) by 0 days.

(21) Appl. No.: 16/488,367

(22) PCT Filed: May 7, 2018

(86) PCT No.: PCT/SG2018/050224
§ 371 (c)(1),
(2) Date: Aug. 23, 2019

(87) PCT Pub. No.: WO2018/212709
PCT Pub. Date: Nov. 22, 2018

(65) Prior Publication Data
US 2020/0037608 A1 Feb. 6, 2020

(30) Foreign Application Priority Data
May 15, 2017 (SG) .......................... 10201703936 U

(51) Int. Cl.
*A01N 25/18* (2006.01)
*A01M 1/20* (2006.01)
*A01N 25/34* (2006.01)

(52) U.S. Cl.
CPC ........... *A01N 25/18* (2013.01); *A01M 1/2055* (2013.01); *A01N 25/34* (2013.01); *A01M 2200/01* (2013.01)

(58) Field of Classification Search
CPC ..... A01N 25/34; A01N 25/18; A01M 1/2055; A01M 2200/01
See application file for complete search history.

(56) References Cited

U.S. PATENT DOCUMENTS

| 5,641,499 A | 6/1997 | Bencsits |
| 6,195,933 B1 | 3/2001 | Woodruff |
| 2004/0247651 A1* | 12/2004 | Morgan .............. A01M 1/2077 424/443 |

FOREIGN PATENT DOCUMENTS

| EP | 0388718 A2 | 9/1990 |
| EP | 0466986 A1 | 1/1992 |

(Continued)

OTHER PUBLICATIONS

International Search Report and Written Opinion issued in PCT/SG2018/050224, dated Aug. 1, 2018.
(Continued)

*Primary Examiner* — Michael B. Pallay
(74) *Attorney, Agent, or Firm* — BakerHostetler

(57) ABSTRACT

A disinfestation article includes a base, external voids and internal voids formed in the base, pesticidal compound disposed in the external and internal voids. The pesticidal compound disposed in the external void being exposed to a surface of the base. The article may further comprise channels connecting one of the internal voids to one of the external voids. The pesticidal compound contains pesticidal particles selected from pyrethroid family or the like. Also claimed is a method of manufacturing which includes mixing pesticidal particles into a molten polymer material to form a mixture, injecting the mixture into a mold to form a molded part, and cooling the molded part to form said disinfestation article.

18 Claims, 7 Drawing Sheets

(56) References Cited

FOREIGN PATENT DOCUMENTS

| GB | 2146531 A | 4/1985 |
|----|-----------|--------|
| GB | 2380940 A | 4/2003 |
| JP | 2000-54259 A | 2/2000 |
| WO | 2008079384 A1 | 7/2008 |

OTHER PUBLICATIONS

Yousif et al., "Photodegradation and Photostabilization of polymers, especially polystyrene: Review", SpringerPlus Open Journal, 2013, vol. 2, No. 398, 32 Pages.
International Preliminary Report on Patentability issued in PCT/SG2018/050224, dated Apr. 18, 2019.

* cited by examiner

LONG-LASTING DISINFESTATION ARTICLE AND METHOD OF MANUFACTURE THEREOF

CROSS-REFERENCE TO RELATED APPLICATIONS

This application is the National Stage of International Patent Application No. PCT/SG2018/050224 filed May 7, 2018, which claims the benefit of Singapore application number 10201703936U, filed May 15, 2017, the disclosures of which are incorporated herein by reference in their entireties.

FIELD OF INVENTION

The present invention relates to pest control, in particular to a water resistant disinfestation article.

BACKGROUND OF INVENTION

Flies, mosquitoes, ants and cockroaches pollutes the environment, spreading bacteria and virus via kitchenware, utensils, food, etc., adversely affecting human health. Other pests infest food storages, collections and wooden products, causing irreparable losses. Traditional ways of exterminating the above mentioned pests are to apply insecticide sprays or pesticidal drugs. Insecticide sprays have limited longevity, hence requiring repeated application, continuously polluting to the environment. Pesticides are highly toxic in large amounts, when used under inadequate supervision would pose a threat in particular to children and pets. It is desirable to have a solution which is effective and long lasting.

SUMMARY OF INVENTION

A first embodiment of the present invention provides a disinfestation article having a base, external voids and internal voids formed in the base, pesticidal compound disposed in the external voids and internal voids. The pesticidal compound disposed in the external void being exposed to a surface of the base.

In another embodiment, the internal voids may include a first internal void and a second internal void positioned spaced apart from the first internal void. The article may further include a first channel formed in the base and connecting the first internal void and a second internal void. Further, the pesticidal compound may be disposed in the first channel.

In yet another embodiment, the external voids may include a first external void opening to a first surface of the base and a second external void opening to a second surface of the base, and the first surface and the second surface face different directions. The article may further include a second channel formed in the base connecting the first external void to the second external void. Further, the pesticidal compound may be disposed in the second channel.

In another embodiment, the base being partially removable to open the internal voids to a surface of the base to expose the pesticidal compound disposed in the internal voids.

In a further embodiment, the internal voids include a third internal void and the external voids include a third external void, the article further comprising a third channel formed in the base connecting the third internal void to the third external void. Further, the pesticidal compound is disposed in the third channel.

In another embodiment, the base is a polymer base. Further, the base may include anti-ultraviolet compounds, such as uv-absorbent or uv-reflecting compounds, and anti-oxidant compounds.

In yet another embodiment, the article is in an elongated, flexible form. Further, the article is woven into a fabric material. In a further embodiment, the article is in a sheet form.

Also disclosed is a method of manufacturing a disinfestation article, including adding pesticidal particles into a molten polymer material to form a mixture, injecting the mixture into a mold to form a molded part, and cooling the molded part to form the disinfestation article. The article comprising external voids and internal voids formed in the base, pesticidal compound disposed in the external voids and internal voids, and the pesticidal compound disposed in the external void being exposed to a surface of the base. In a further embodiment, adding anti-ultraviolet compounds, such as uv-absorbent or uv-reflecting compounds, and/or antioxidant compounds may be added into the mixture.

Other aspects and advantages of the present invention will become apparent from the following detailed description, illustrating by way of example the inventive concept and technical solution of the present invention.

BRIEF DESCRIPTION OF THE DRAWINGS

Embodiments of the invention are disclosed hereinafter with reference to the drawings, in which.

DETAILED DESCRIPTION OF THE PREFERRED EMBODIMENTS

Figure 1:
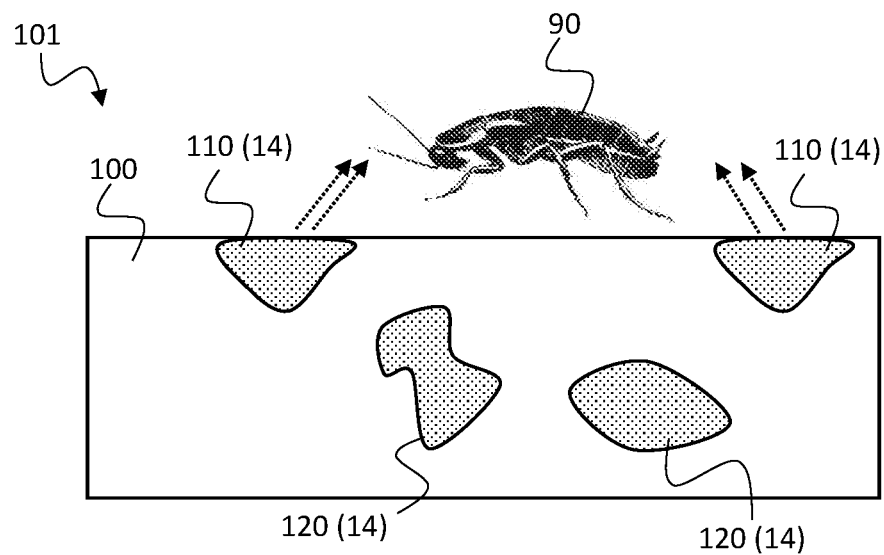
FIG. 1 is a sectional view of a disinfestation article according to a first embodiment of the present invention when used for pest disinfestation.

FIG. 1 illustrates a water resistant disinfestation article 101 according to a first embodiment of the present invention. Article 101 may be in the form of a sheet, pad, plate, board or the like, and comprises a base 100, made of polymer material such as polyethylene, external voids or recesses 110 formed on an external surface of the base 10, internal void 120 formed internally of the base 100, and pesticidal material 14 disposed in the external and internal voids 110, 120. The external voids 110 are formed in such a way that the contents of the pesticidal material 14 can be released from the void to the exterior of the base 100, thus producing disinfestation effects to pest/insects 90 that may be resent and/or pass over the external surface of article 101. Pesticidal material 14 may contain pesticidal ingredients of pyrethroid family, such as cypermethrin, deltamethrin, etc.

"External void" in the context refers to a cavity formed in, and partially encapsulated by, the base, and opens to a surface of the base. "Internal void" in the context refers to a cavity formed in and fully encapsulated by the base.

When pests 90 are in contact with article 101 e.g. crawling onto the top surface, the contents of pesticidal material 14 disposed in the external void 110 will react with the pests' integral membrane protein, hindering the pests' nerve cells and associated functions, eventually kill the pests within short period of time. Additionally, pesticidal material 14 do not adhere to mammalian skin easily. In the unlikely event of being inhaled by a mammal or ingested into a mammal body, the pesticidal material 14 will be rapidly metabolized and degraded into non-toxic byproducts and metabolites to be eventually excreted. Thus pesticidal material 14 are innocuous and non-toxic to human body, rendering the disinfestation sheet safe for use.

The base 100 may include anti-ultraviolet compounds, such as uv-absorbent or uv-reflecting compounds, and anti-oxidant compounds to hinder degradation of the base 100 due to the possible effect of oxidation and/or ultraviolet irradiation from surrounding environment.

Figure 2A:
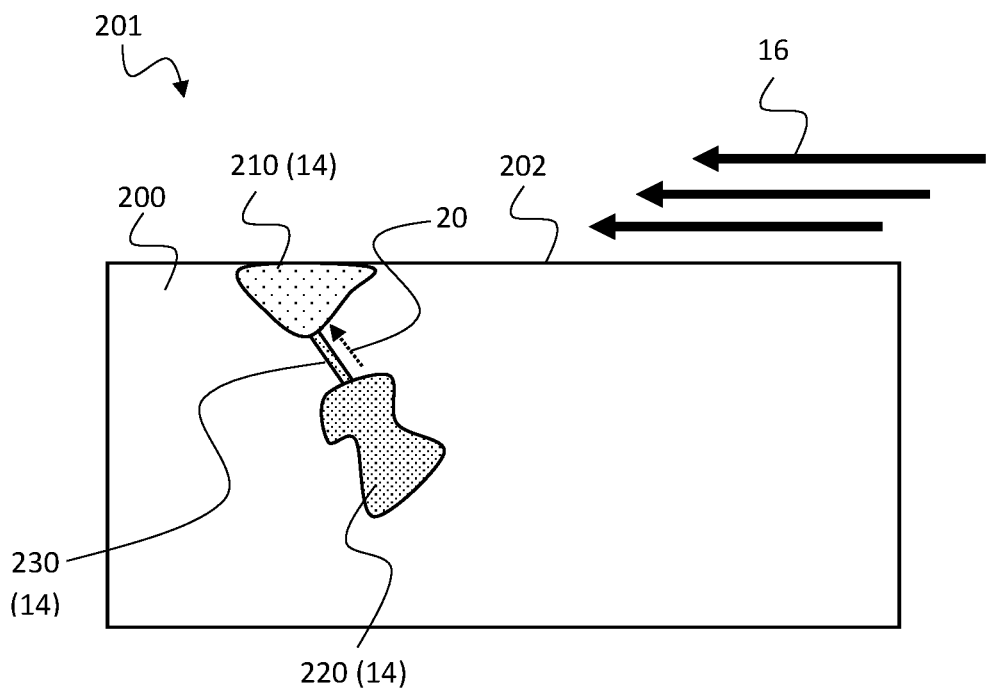
FIG. 2A is a sectional view of a disinfestation article according to a second embodiment of the present invention.

FIG. 2A illustrates a disinfestation article 201 according to a second embodiment. The article 201 comprises a base 200, a first external void 210 formed on a first surface 202 of the base 200, a first internal void 220 formed internally of the base 200, a first channel 230 formed internally of the base 200, the first channel 230 connecting the first external void 210 and the first internal void 220, and pesticidal material 14 disposed in the first external void 210, the first internal void 220 and the first channel 230. The first external void 210 is formed and positioned to partially expose to the exterior of base 200, in such a way that the contents of pesticidal material 14 can be released from the first external void 210 to the exterior of the base 200, by e.g. diffusion and/or sublimation, thus providing disinfestation effects on the surface of base 200. The first internal void 220 is formed internally of the base 200, not in direct contact with the exterior of the base 200. The first channel 230 is formed connecting the first internal void 220 to the first external void 210, allowing movement and/or migration of pesticidal material 14 therebetween.

In the context, the feature "channel" refers to a hollow structure formed in the base, having a cross sectional dimension smaller than that of the internal void and external voids.

In the event of a depletion or displacement of pesticidal material 14 in the first external void 210, such as by a fluid flow 16 on the first face 202 of the base 200 or any other events reducing the amount of pesticidal material 14 in the first external void 210, pesticidal material 14 disposed in the first channel 230 and the first internal void 220 will displace and move 20 towards the first external void 210 to supplement the pesticidal contents in the first external void 210, to continue providing disinfestation effect on the first surface 202. The possible mechanism of such displacement is due to zone of higher concentration of pesticidal material 14 in internal void 220 diffuses towards the zone of lower concentration of pesticidal material 14 in external void 210. This allows the disinfestation article 201 to continue producing disinfestation effects on the surface of base 200 in the event of water erosion or prolonged usage or exposure to the surrounding environment.

Figure 2B:
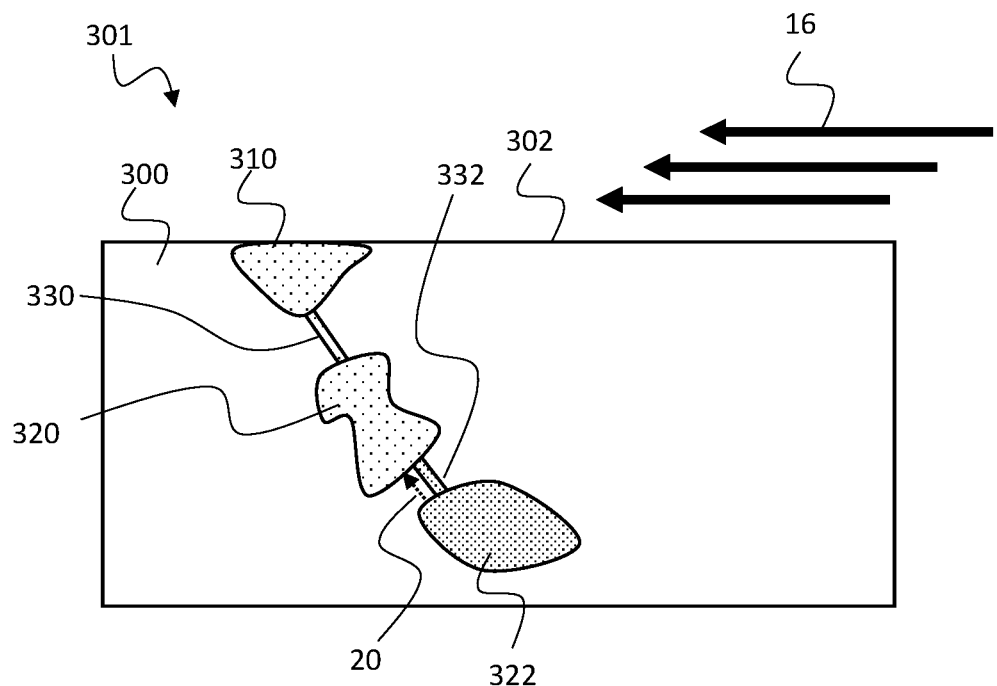
FIG. 2B is a sectional view of a disinfestation article according to a third embodiment of the present invention.

In a third embodiment illustrated in FIG. 2B, a disinfestation article 301 comprises a base 300, a first external void 310 formed on a first surface 302 of the base 300, a first internal void 320 formed internally of the base 300, a first channel 330 formed internally of the base 300, the first channel connecting the first external void 310 and the first internal void 320, and pesticidal material 14 disposed in the first external void 310, the first internal void 320 and the first channel 330. Disinfestation article 301 further comprises a second internal void 322 formed internally of the base 300, a second channel 332 formed internally of the base 300 and pesticidal material 14 disposed in the second internal void 322 and the second channel 332. The second channel 332 is formed connecting the second internal void 322 to the first internal void 320. In the event of a depletion, degradation or displacement of pesticidal material 14 in the first external void 310 and first internal void 320, the pesticidal material 14 disposed in the second channel 332 and the second internal void 322 will displace and migrate towards the first external void 310 and the first internal void 320 to supplement the pesticidal contents in the first external void 310 and the first internal void 320, to continue providing disinfestation effect on the first surface 302.

Figure 2C:
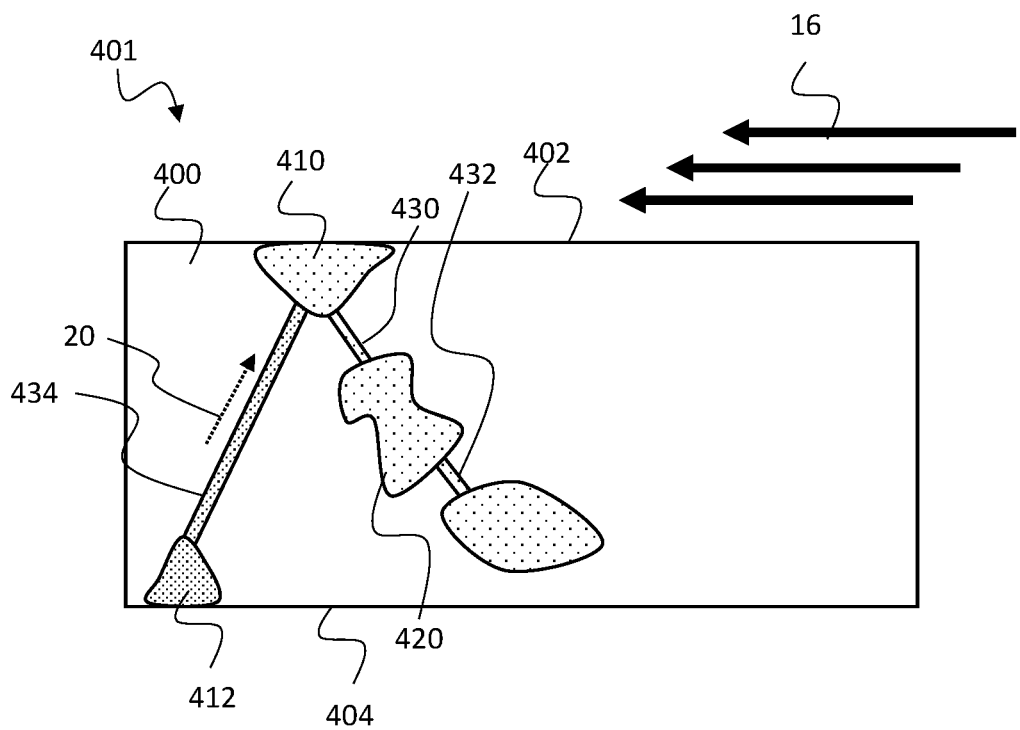
FIG. 2C is a sectional view of a disinfestation article according to a forth embodiment of the present invention.

In a fourth embodiment illustrated in FIG. 2C, a disinfestation article 401 comprises a base 400, a first external void 410 formed on a first surface 402 of the base 400, a first internal void 420 and a second internal void 422 formed internally of the base 400, a first channel 430 formed internally of the base 400, the first channel 430 connecting the first external void 410 and the first internal void 420, a second channel 432 formed internally of the base 400, the second channel 432 connecting the first internal void 420 and the second internal void 422, and pesticidal material 14 disposed in the first external void 410, the first internal void 420, the second internal void 422, the first channel 430 and the second channel 432. Disinfestation article 401 further comprises a second external void 412 formed on a second surface 404 of the base 400, a third channel 434 formed internally of the base 400 and pesticidal material 14 disposed in the second external void 412 and the third channel 434. The third channel 434 is formed connecting the second external void 412 to the first external void 410. In the event of a depletion, degradation or displacement of pesticidal material 14 in the first external void 410, such as by a fluid flow 16 on the first face 402 of the base 400 or any other events reducing the amount of pesticidal material 14 in the first external void 410, pesticidal material 14 disposed in the second external void 412 which are not affected by the depletion will displace, diffuse and move along direction 20 towards the first external void 410 to supplement the pesticidal contents in the external void 410, to continue providing disinfestation effect on the first surface 402.

Figure 3:
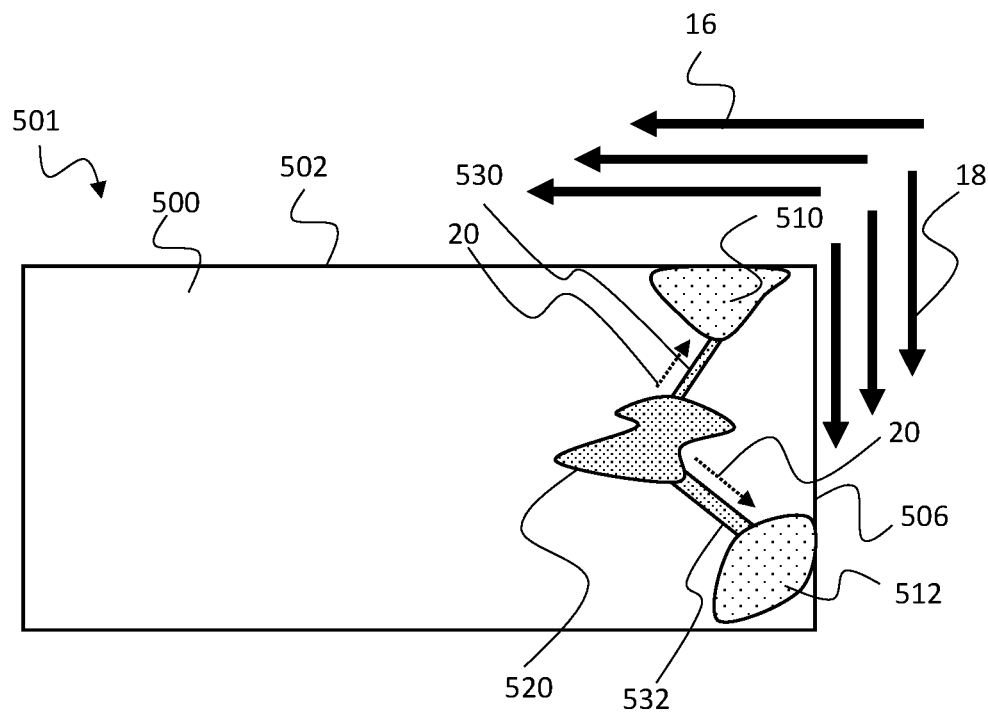
FIG. 3 is a sectional view of a disinfestation article according to a fifth embodiment of the present invention.

FIG. 3 illustrates a fifth embodiment of a disinfestation article 501. The disinfestation article 501 comprises a base 500, a first external void 510 formed on a first surface 502 of the base 500, a second external void 512 formed on a second surface 506 of the base 500, a first internal void 520 formed internally of the base 500, a first channel 530 formed internally of the base 500, a second channel 532 formed internally of the base 500 and pesticidal material 14 disposed in the first external void 510, the second external void 512, the first internal void 520, the first channel 530 and the second channel 532. The first external void 510 and the second external void 512 are formed partially exposing to the exterior of base 500, in such a way that the pesticidal material 14 can be released from the first external void 510 and the second external void 512 to the exterior of the base 500, thus producing disinfestation effects on the first surface 502 and second surface 506. The first internal void 520 is formed within the base 500, not in direct contact with the exterior of the base 500. The first channel 530 is formed connecting the first internal void 520 to the first external void 510, allowing movement, migration/displacement of pesticidal material 14 therebetween. The second channel 532 is formed connecting the first internal void 520 to the second external void 512, allowing movement, migration/displacement of pesticidal material 14 therebetween.

In the event of a depletion or displacement of pesticidal material 14 in the external voids 510 and 512, such as by a fluid flow 16 on the first face 502 of the base 500 or a fluid flow 18 on the second face 506 of the base 500, or any other events reducing the amount of pesticidal material 14 in the external voids 510 and 512, pesticidal material 14 disposed in the connecting voids 530/532 and the first internal void 520 will displace, migrate and/or move along direction 20 towards the external voids 510 and 512, to supplement the pesticidal contents in the external void 510 and 512, to continue providing disinfestation effect on the first surface 502 and second surface 506.

Figure 4:
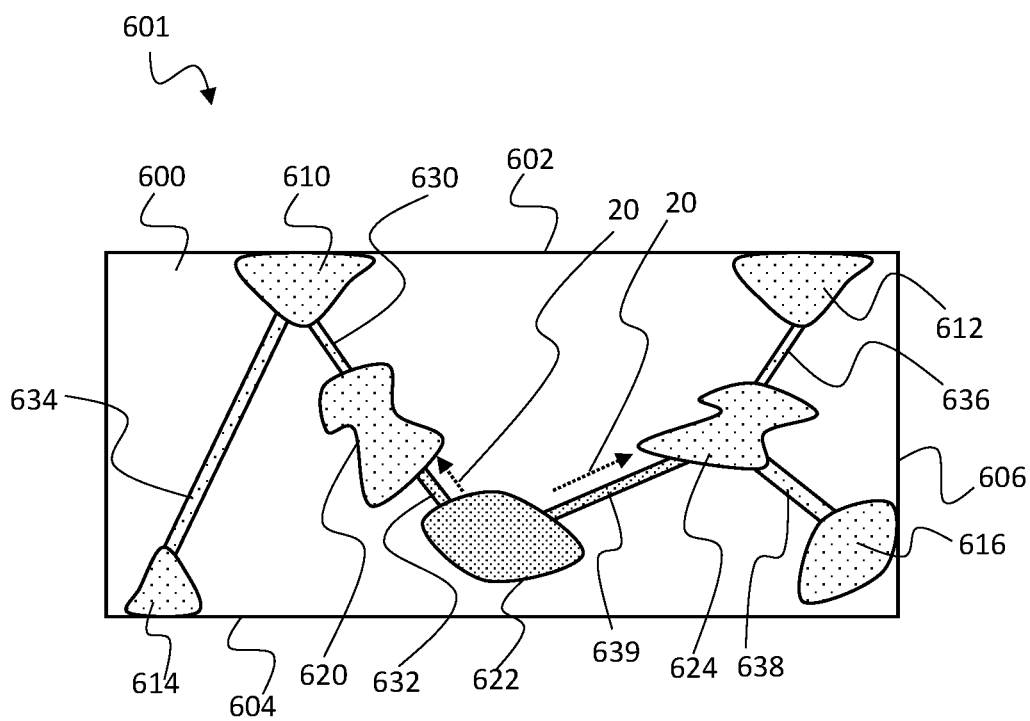
FIG. 4 is a sectional view of a disinfestation article according to a sixth embodiment of the present invention.

FIG. 4 illustrates a sixth embodiment of a disinfestation article 601. The disinfestation article 601 comprises a base 600, a first external void 610 and a second external void 612 formed on a first surface 602 of the base 600, a third external void 614 formed on a second surface 604 of the base 600, a forth external void 616 formed on a third surface 606 of the base 600, a first/second/third internal void 620/622/624 formed internally of the base 600 and pesticidal material 14 disposed in the external voids 610/612/614/616 and the internal voids 620/624/626. The external voids 610/612/614/616 are formed and positioned to partially expose to the exterior of base 600, in such a way that the pesticidal material 14 can be released from the external voids 610/612/614/616 to the exterior of the base 600, thus producing disinfestation effects on the first, second and third surfaces 602, 604 and 606. The internal voids 620/622/624 are formed internally of the base 600, not in direct contact with the exterior of the base 600. The disinfestation article 601 further comprises a first channel 632, a second channel 639 and a plurality of channels 630/634/636/638 formed internally of the base 600 and with pesticidal material 14 disposed in the channels 630/632/634/636/638/639. The first channel 632 is formed connecting the second internal void 622 to the first internal void 620, allowing movement/migration of pesticidal material 14 therebetween. The second channel 639 is formed connecting the second internal void 622 to the third internal void 624, allowing movement, migration and/or displacement of pesticidal material 14 therebetween.

In the event of a depletion or displacement of pesticidal material 14 in the internal voids 620/624 and external voids 610/612/614/616, pesticidal material 14 disposed in the connecting voids 632/639 and the internal void 622 will displace and move along direction 20 towards the internal voids 620/624 and further to external voids 610/612/614/616 to supplement the pesticidal contents, to continue providing disinfestation effect on the first surface 602, second surface 604 and third surface 606.

Figure 5A:
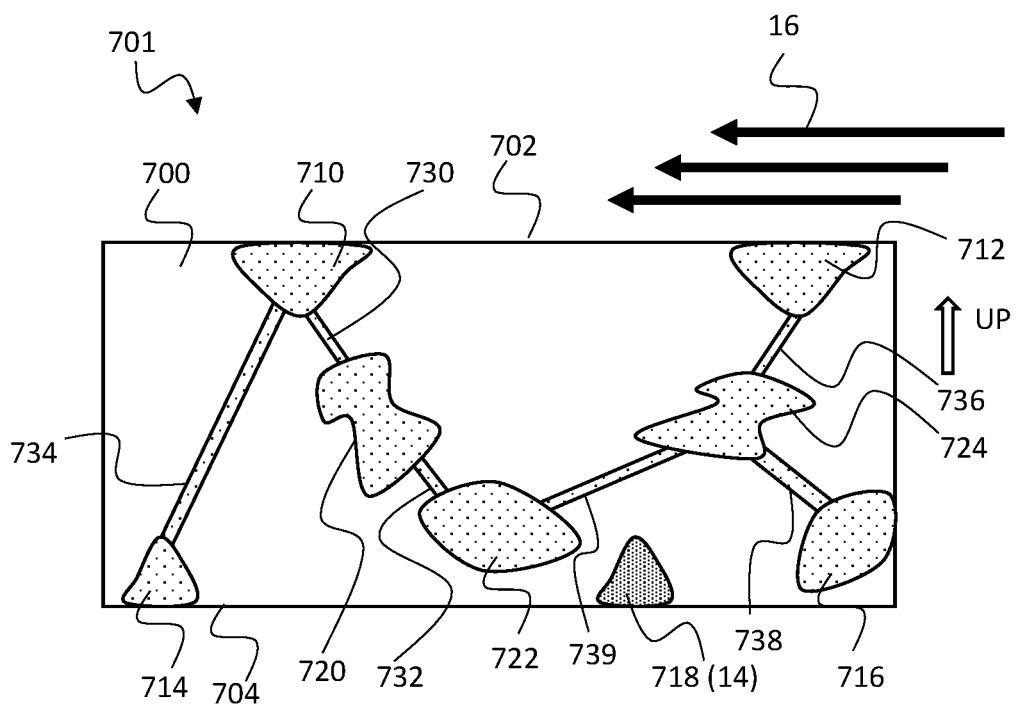
FIG. 5A is a sectional view of a disinfestation article according to a seventh embodiment of the present invention.
Figure 5B:
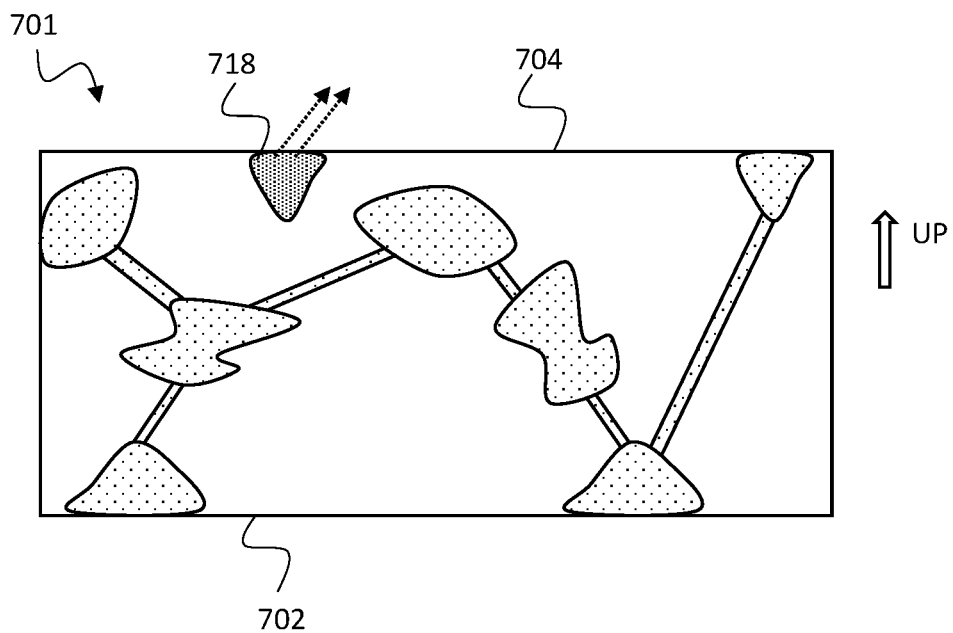
FIG. 5B is a sectional view of a disinfestation article in a flipped position according to the seventh embodiment of the present invention.

In a seventh embodiment shown in FIGS. 5A and 5B, a disinfestation article 701 comprises a base 700, external voids 710/712/714/716, internal voids 720/722/724 and channels 730/732/734/l36/738/739, formed and positioned with respect to base 700 in a manner similar to the previous embodiments. Disinfestation article 701 further comprises an isolated external void 718 formed on a second face 704 of the base 700 and pesticidal material 14 disposed in the isolated external void 718. The isolated external void 718 is formed in such a way that the pesticidal material 14 can be released from the isolated external voids 718 to the exterior of the base 700, thus producing disinfestation effects on the second surface 704. Further, the isolated external void 718 is formed not connected to any other external voids, internal voids or channels. In other words, the isolated external void 718 is partially enclosed by the base 700, with the only areas not enclosed by the base 700 being exposed to the exterior of the base 700. When pesticidal material 14 are depleted or displaced due to a fluid flow 16 on the first face 702 of the base 700 resulting in degradation of performance of the disinfestation article 701, the disinfestation article 701 may be flipped upside-down such that the second face 704 is upwardly oriented (shown in FIG. 5B), allowing the isolated external void 718 to continue producing disinfestation effects, thus extending the disinfestation period of the disinfestation article 701.

Figure 6A:
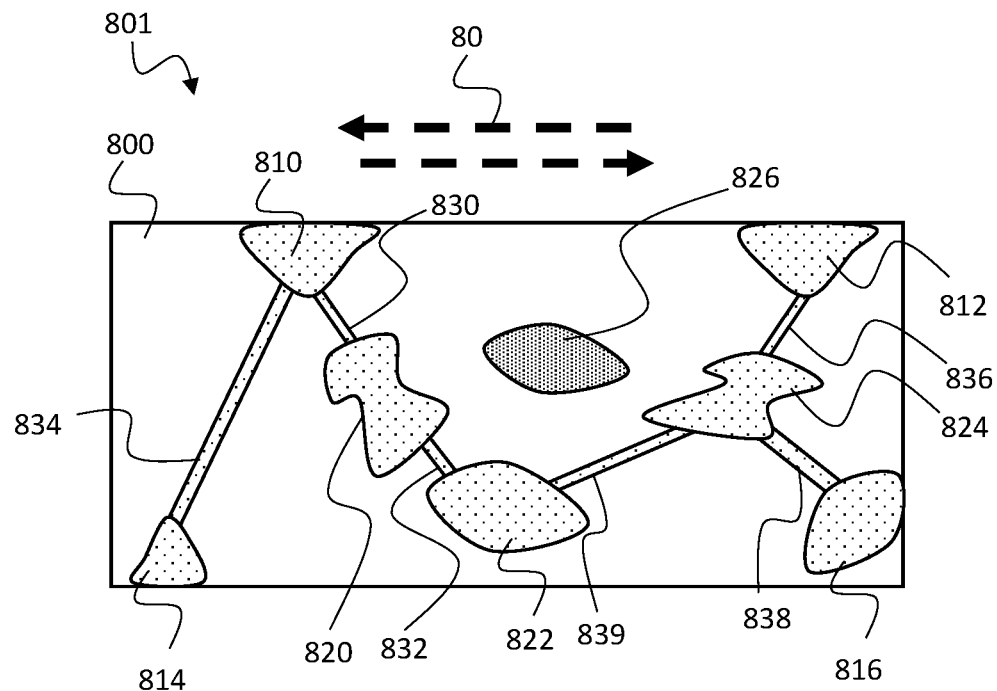
FIG. 6A is a sectional view of a disinfestation article according to an eighth embodiment of the present invention.
Figure 6B:
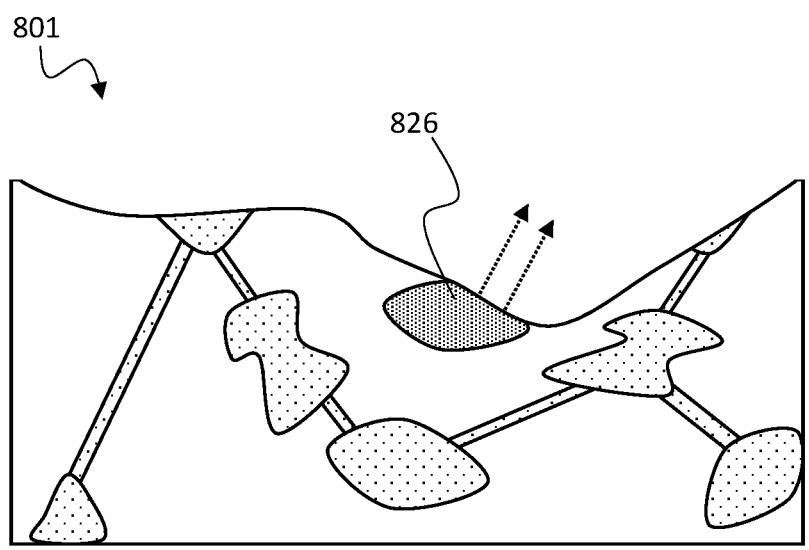
FIG. 6B is a sectional view of a disinfestation article shown in FIG. 6A.

In an eighth embodiment shown in FIGS. 6A and 6B, a disinfestation article 801 comprises a base 800, external voids 810/812/814/816, internal voids 820/822/824 and channels 830/832/834/836/838/839, formed and positioned with respect to base 800 in a manner similar to the previous embodiments. Disinfestation article 801 further comprises an isolated internal void 826 formed internally of the base 800. The isolated internal void 826 is formed in such a way that it is fully enclosed by the base 800, unconnected to any other external voids, internal voids or connecting voids. When disinfestation article 801 is subjected to mechanical wear 80 or other form of erosion mechanism involving wear to the base 800, isolated internal void 826 will become at least partially exposed to the exterior of the base 800 (FIG. 6B), producing disinfestation effects and thus extending the disinfestation period of the disinfestation article 801.

Figure 7:
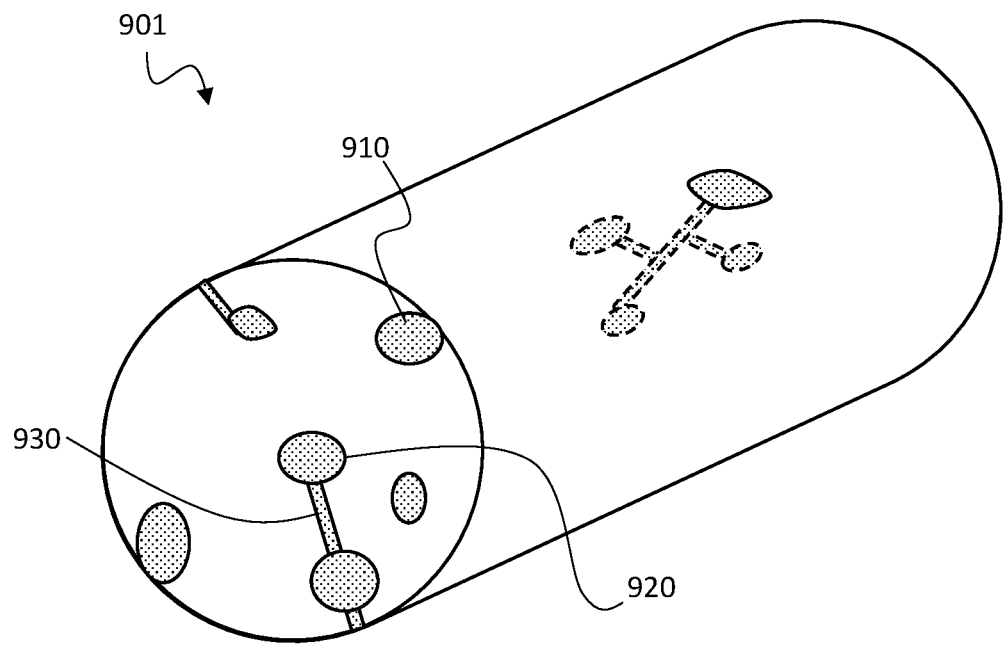
FIG. 7 is a schematic view of a disinfestation article in a thread form according to a ninth embodiment of the present invention.
Figure 8:
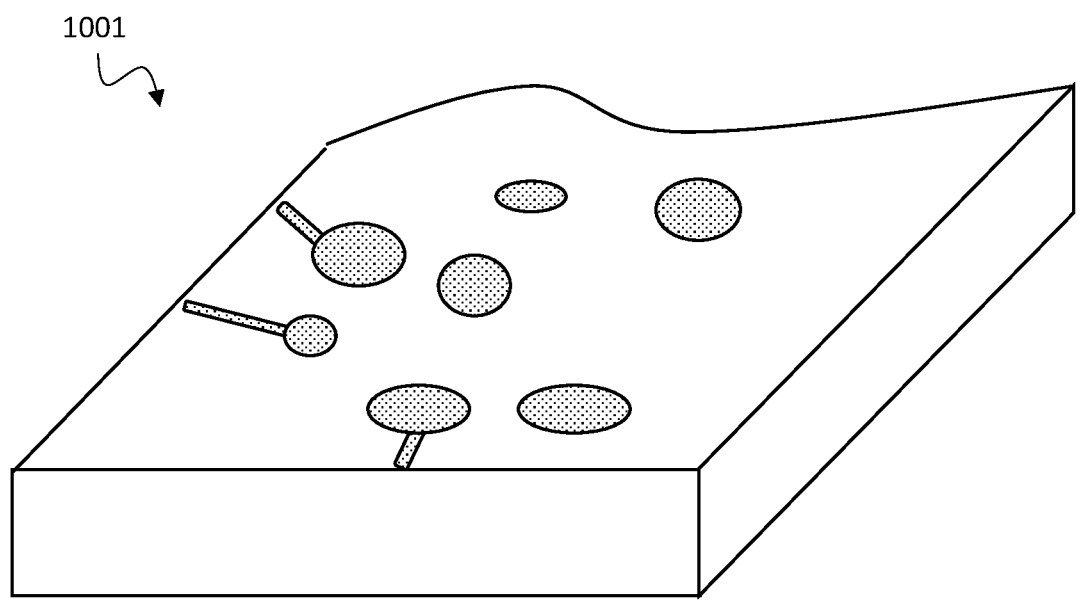
FIG. 8 is a schematic view of a disinfestation article in a sheet form according to a tenth embodiment of the present invention.

In a ninth embodiment shown in FIG. 7, a disinfestation article 901 is formed by elements of elongated, flexible form, for instance a thread form, with external voids 910, internal voids 920 and channels 930 formed and positioned in the base 900 in a manner similar to the previous embodiments, and with multiple threads weaved to form a fabric material. Such fabric material may be used in manufacturing of disinfestation products, for instance a woven sheet, pad, board or the like. In a tenth embodiment shown in FIG. 8, disinfestation article 1001 may be formed of a sheet form by e.g. blow molding.

Figure 9:
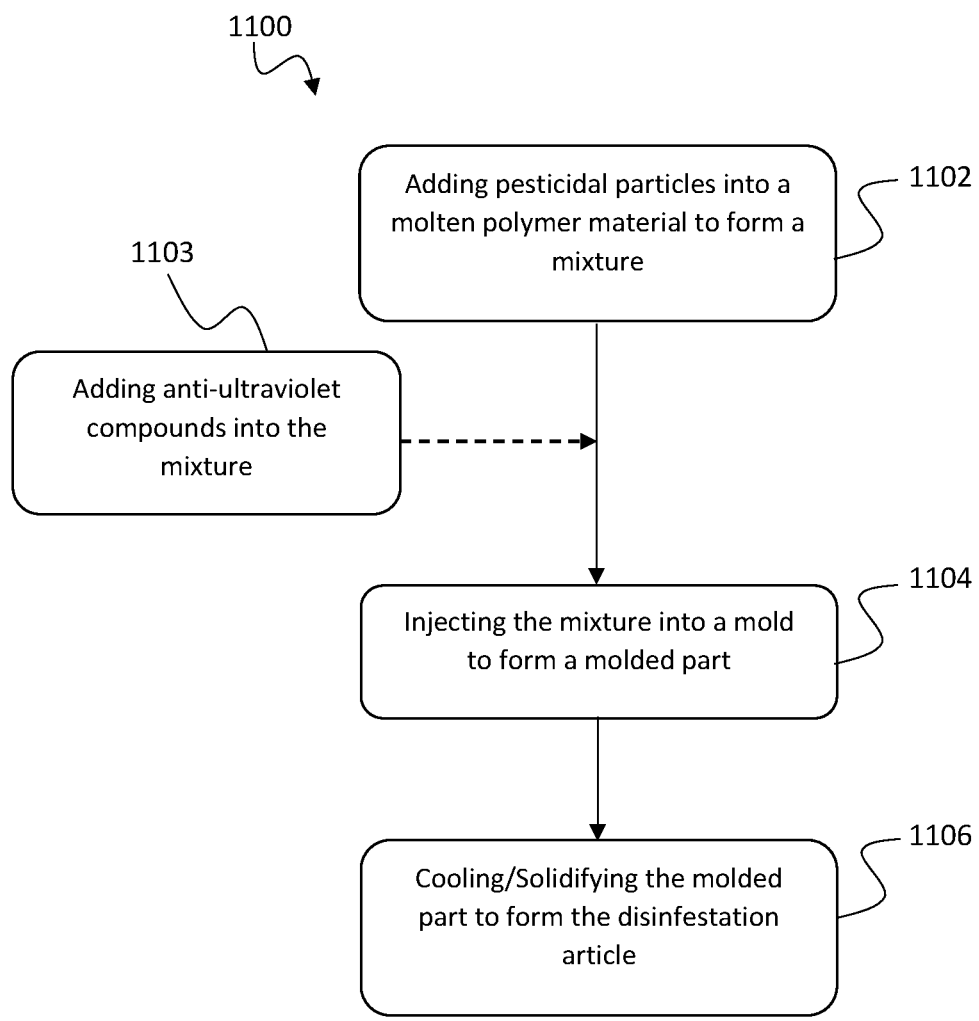
FIG. 9 is a flow chart of a method of manufacturing a disinfestation article.

FIG. 9 illustrates a method of manufacturing a disinfestation article according an embodiment of the present invention. At block 1102, pesticidal particles are added into a molten polymer material to form a polymer mixture. Optionally, at block 1103, anti-ultraviolet compounds, such as uv-absorbent or uv-reflecting compounds, and/or antioxidant compounds may be added into the mixture. At block 1104, the mixture is injected into a mold to form a molded part. Manufacturing processes such as blow molding, injection molding, etc are examples of processes used to form the molded part. At block 1106, the molded part is cold and solidified to form the disinfestation article. Cooling can be done by natural air cooling, forced convection cooling, etc.

It should be appreciated that the present invention is not to be limited in scope by the specific embodiments described here in. Various modifications of the invention in addition to those described herein will become apparent to those skilled in the art from the foregoing description and accompanying drawings. Such modifications are intended to fall within the scope of the claims appended therein.

The invention claimed is:

1. A disinfestation article, comprising:
a base;
external voids, internal voids and isolated internal void formed in the base;
pesticidal compound disposed in the external voids, internal voids and isolated internal void,
wherein the pesticidal compound disposed in the external void being exposed to a surface of the base,
wherein the base is partially removable to open the isolated internal void to the surface to expose the pesticidal compound in the isolated internal void to the surface of the base.

2. The article as recited in claim 1, further comprising a channel formed in the base and connecting one of the internal voids to one of the external voids.

3. The article as recited in claim 2, wherein the pesticidal compound is disposed in the channel.

4. The article as recited in claim 1, wherein the internal voids include a first internal void and a second internal void positioned spaced apart from the first internal void.

5. The article as recited in claim 4, further comprising a first channel formed in the base and connecting the first internal void and a second internal void.

6. The article as recited in claim 5, wherein the pesticidal compound is disposed in the first channel.

7. The article as recited in claim 1, wherein the external voids include a first external void opening to a first surface of the base and a second external void opening to a second surface of the base, wherein the first surface and the second surface face different directions.

8. The article as recited in claim 7, further comprising a second channel formed in the base connecting the first external void to the second external void.

9. The article as recited in claim 7, wherein the pesticidal compound is disposed in the second channel.

10. The article as recited in claim 1, wherein the base being partially removable to open the internal voids to a surface of the base to expose the pesticidal compound disposed in the internal voids.

11. The article as recited in claim 1, wherein the internal voids include a third internal void and the external voids include a third external void, the article further comprising a third channel formed in the base connecting the third internal void to the third external void.

12. The article as recited in claim 11, wherein the pesticidal compound is disposed in the third channel.

13. The article as recited in claim 1, wherein the base includes anti-ultraviolet compounds.

14. The article as recited in claim 13, wherein the anti-ultraviolet compounds include, uv-absorbent compounds.

15. The article as recited in claim 13, wherein the anti-ultraviolet compounds include uv-reflecting compounds.

16. The article as recited in claim 1, wherein the base includes antioxidant compounds.

17. The article as recited in claim 1, wherein the article is woven into a fabric material from elongated flexible threads.

18. The article as recited in claim 1, wherein the article is in a sheet form.

* * * * *